US011377105B2

(12) United States Patent
Witting et al.

(10) Patent No.: US 11,377,105 B2
(45) Date of Patent: Jul. 5, 2022

(54) OFF-ROAD VEHICLE SPEED CONTROL ASSEMBLY

(71) Applicant: Nissan North America, Inc., Franklin, TN (US)

(72) Inventors: Sarah Witting, Commerce Township, MI (US); Avinaash Ramakrishnan, Brighton, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 428 days.

(21) Appl. No.: 16/539,463

(22) Filed: Aug. 13, 2019

(65) Prior Publication Data
US 2021/0046934 A1    Feb. 18, 2021

(51) Int. Cl.
*B60W 30/18*    (2012.01)
*B60W 10/04*    (2006.01)
(Continued)

(52) U.S. Cl.
CPC ...... *B60W 30/18009* (2013.01); *B60W 10/04* (2013.01); *B60W 10/30* (2013.01);
(Continued)

(58) Field of Classification Search
CPC ........... B60W 30/18009; B60W 10/04; B60W 10/30; B60W 50/14; B60W 2050/146;
(Continued)

(56) References Cited

U.S. PATENT DOCUMENTS

| 7,053,761 B2 * | 5/2006 | Schofield | B60R 1/12 340/447 |
| 7,528,705 B2 * | 5/2009 | Brown, Jr. | B60C 23/0408 340/442 |

(Continued)

FOREIGN PATENT DOCUMENTS

| JP | 2005-212620 A | 8/2005 |
| JP | 2010-230381 A | 10/2010 |
| JP | 2012-224159 A | 11/2012 |

OTHER PUBLICATIONS

International Patent Application Serial No. PCT/US18/42808; Vehicle Tire Pressure Monitoring Interface; C Phillips et al.; filed Jul. 19, 2018.
(Continued)

*Primary Examiner* — Frederick M Brushaber
(74) *Attorney, Agent, or Firm* — Global IP Counselors, LLP

(57) ABSTRACT

An off-road vehicle speed control assembly that includes a speed control device, a speed sensor, tire pressure sensors and an electronic controller. The speed control device controls speed of a vehicle power plant. The electronic controller is in electronic communication with the speed control device, the speed sensor and the plurality of tire pressure sensors and is configured to operate the speed control device in at least two different modes of operation: a normal mode in which the plurality of tires are inflated to a high-speed tire pressure; and, a first off-road mode in which the plurality of tires are inflated to a first off-road tire pressure that is less
(Continued)

than the high-speed tire pressure. In the normal mode, speeds of the vehicle are unrestricted by the electronic controller. In the first off-road mode, speed of the vehicle is restricted.

13 Claims, 4 Drawing Sheets

(51) Int. Cl.
  *B60W 10/30* (2006.01)
  *B60W 50/14* (2020.01)
  *B60C 23/02* (2006.01)
  *B60W 10/06* (2006.01)
  *B60W 10/111* (2012.01)

(52) U.S. Cl.
  CPC .............. *B60W 50/14* (2013.01); *B60C 23/02* (2013.01); *B60W 2050/146* (2013.01); *B60W 2400/00* (2013.01); *B60W 2520/10* (2013.01); *B60W 2540/215* (2020.02); *B60W 2556/00* (2020.02); *B60W 2720/106* (2013.01)

(58) Field of Classification Search
  CPC ......... B60W 2400/00; B60W 2520/10; B60W 2540/215; B60W 2556/00; B60W 2720/106; B60W 10/06; B60W 10/111; B60W 2530/20; B60W 2710/0661; B60W 2710/1005; B60W 2720/10; B60W 30/143; B60W 50/082; B60C 23/02; B60C 23/0401
  See application file for complete search history.

(56) References Cited

U.S. PATENT DOCUMENTS

| | | | |
|---|---|---|---|
| 8,749,367 B2 | 6/2014 | Schofield et al. | |
| 2018/0104993 A1* | 4/2018 | Gillen | B60C 23/008 |

OTHER PUBLICATIONS

International Patent Application Serial No. PCT/US18/42803; Vehicle Tire Pressure Monitoring System C Phillips et al.; filed Jul. 19, 2018.

* cited by examiner

OFF-ROAD VEHICLE SPEED CONTROL ASSEMBLY

BACKGROUND

Field of the Invention

The present invention generally relates to an off-road vehicle speed control assembly. More specifically, the present invention relates to an off-road vehicle speed control assembly that limits the maximum speed of an off-road vehicle to a selected maximum speed when the vehicle has been set to off-road operation with a reduced or lowered tire pressure.

Background Information

There are many vehicles that are designed for off-road operation. During off-road operation, the air pressure in each of the tires is typically reduced to a pressure that is lower than highway driving (also referred to as normal driving operation).

SUMMARY

One object of the present disclosure is to provide an off-road vehicle with an off-road vehicle speed control assembly that limits the maximum speed of the off-road vehicle to a selected maximum speed with a reduced or lowered tire pressure when the vehicle has been set to off-road operation.

In view of the state of the known technology, one aspect of the present disclosure is to provide an off-road vehicle speed control assembly with a speed control device, a speed sensor, a plurality of tire pressure sensors and an electronic controller. The speed control device is configured to control speed of a vehicle power plant of a vehicle. The speed sensor is configured to measure speed of the vehicle. The plurality of tire pressure sensors are installed to corresponding ones of a plurality of tires of the vehicle. The electronic controller is in electronic communication with the speed control device, the speed sensor and the plurality of tire pressure sensors. The electronic controller is configured to operate the speed control device in at least two different modes of operation: a normal mode; and a first off-road mode. In the normal mode, the plurality of tires are inflated to a high-speed tire pressure. In the first off-road mode in which the plurality of tires are inflated to a first off-road tire pressure that is less than the high-speed tire pressure. Further, in the normal mode, speeds of the vehicle are unrestricted by the electronic controller. In the first off-road mode, speeds of the vehicle are restricted by the electronic controller to speeds at or below a first off-road speed limit.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
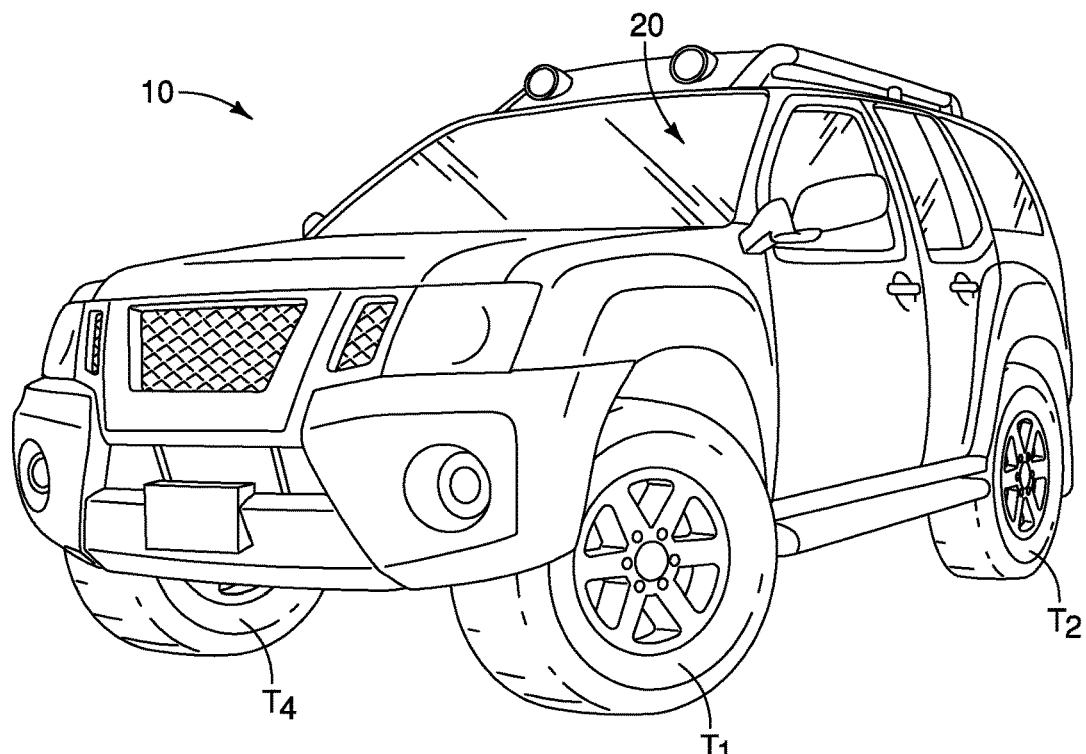
FIG. 1 is a perspective view of a vehicle configured for operation in a normal driving mode that includes highway driving and off-road modes of operation that includes driving over rough off-road terrain in accordance with an exemplary embodiment.

Referring initially to FIG. 1, a vehicle 10 having an off-road speed control assembly 12 (FIG. 2) is illustrated in accordance with a first embodiment.

The vehicle 10 is an off-road vehicle that is configured to be driven over rough terrain, such as rocky surfaces, sandy surfaces, mud, rivers, etc. depending upon the locale and the whims of the vehicle operator. The vehicle 10 includes four tires $T_1$, $T_2$, $T_3$ and $T_4$, an engine 16, transmission 18 (with a transfer case), a passenger compartment 20, an instrument cluster 22 that includes a display 24 and the off-road speed control assembly 12.

Figure 2:
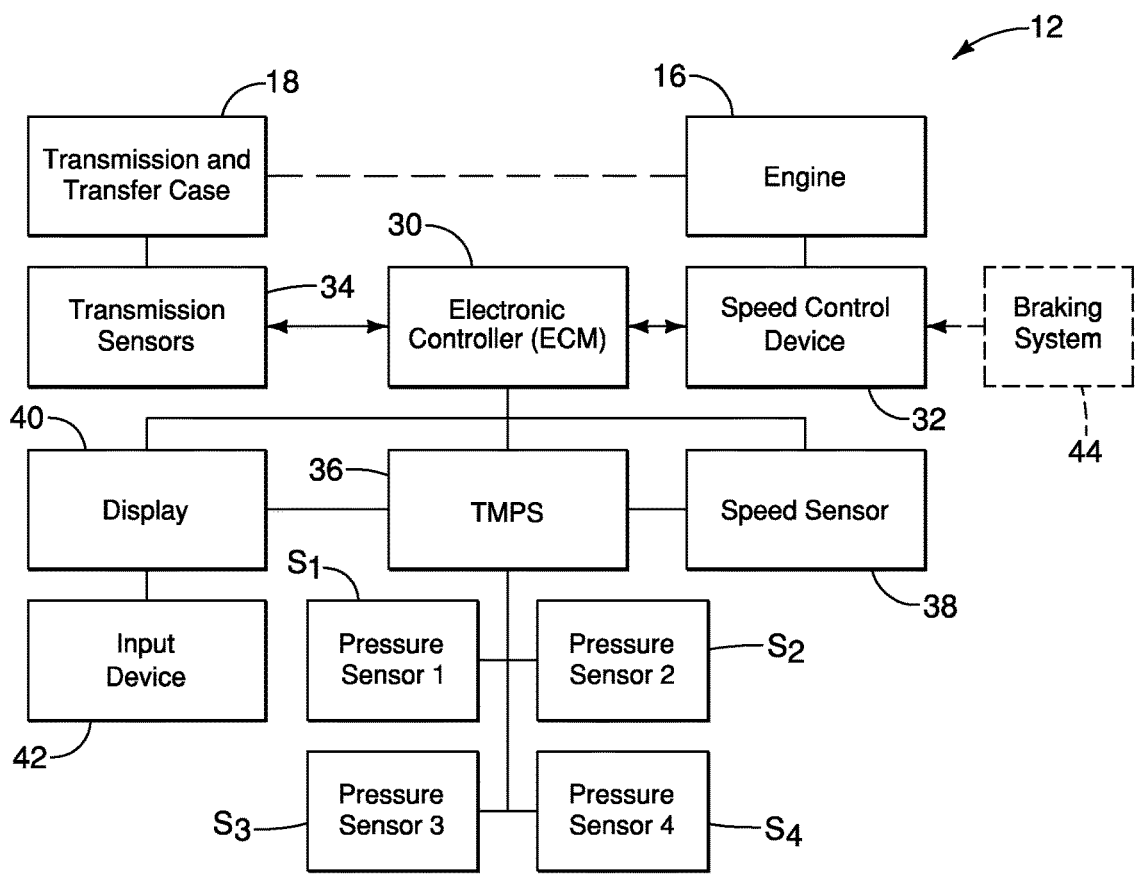
FIG. 2 is a block diagram of an off-road speed control assembly of the vehicle depicted in FIG. 1, showing an electronic controller (ECM), a speed sensor, tire air pressure sensors, transmission and transfer case, an engine (a power plant) and a speed control device directly connected to the engine in accordance with the exemplary embodiment.

As shown in FIG. 2, the off-road speed control assembly 12 basically includes an electronic controller 30, a speed control device 32, transmission sensors 34, a tire pressure monitor system 36 (the TMPS 36), a speed sensor 38, a display 40 and an input device 42. The off-road speed control assembly 12 is also referred to herein below as an automatic speed limiter (ASL), The electronic controller 30 preferably includes a microcomputer with a vehicle speed control program that controls the speed of the vehicle 10 with the vehicle 10 operating in off-road conditions, as discussed below. The electronic controller 30 can also include other conventional components such as an input interface circuit connected to the input device 42, an output interface circuit connected to the display 40, and storage devices such as a ROM (Read Only Memory) device and a RAM (Random Access Memory) device. The microcomputer of the electronic controller 30 is programmed to control the speed control device 32 and the display 40, as well as communicate with all connected sensors (described further below). The memory circuit stores processing results and control programs such as ones for vehicle speed control operation that are run by the processor circuit. The electronic controller 30 is operatively coupled to the each of the elements of the off-road speed control assembly 12 in a conventional manner. The internal RAM of the electronic controller 30 stores statuses of operational flags and various control data. The internal ROM of the electronic controller 30 stores the various control codes and instructions necessary for the various operations described hereinbelow. The electronic controller 30 is capable of selectively controlling any of the components of the off-road speed control assembly 12 in accordance with the control program. It will be apparent to those skilled in the art from this disclosure that the precise structure and algorithms for the electronic controller 30 can be any combination of hardware and software that will carry out the functions of the present invention.

The electronic controller 30 can be part of a conventional vehicle electronic control module or ECM, or can be a separate stand-alone electronic controller that communicates with the ECM of the vehicle 10.

The speed control device 32 is configured to control speed of the vehicle 10 by controlling the power output of the engine 16 (a vehicle power plant of the vehicle). The engine 16 can be an internal combustion engine, a hybrid power plant or an electric motor (with battery or batteries). The speed control device 32 can be any of a variety of control devices of the engine 16, such as one of the following: an electronic throttle controller of the engine 16, a step motor connected to an accelerator cable or accelerator control device of the engine 16, a fuel injection control device, or any part of the engine 16 that can control acceleration and deceleration of the engine 16 and hence the vehicle 10. Optionally, the speed control device 32 can be connected to and can operate a braking system 44 of the vehicle 16, as shown in FIG. 2, of desired. Further, the speed control device 32 can also be connected to the transmission 18 in order to restrict the gear shifting capabilities of the transmission 18 as another feature operated to control vehicle speed.

The transmission sensors 34 are connected to the transfer case of the transmission 18. As used herein, the transfer case of the transmission 18 is any gear system that includes mechanism(s) that enable a vehicle operator two switch between a high-gear ratio output and a low-gear ratio output. The transfer case can be part of the transmission 18, or, can be a separate unit mechanically connected to the transmission 18. Typically, the high-gear ratio output corresponds to torque and output speeds from the transmission 18 via the transfer case to at least two of the tires $T_1$, $T_2$, $T_3$ and $T_4$, where the gears of the transmission 18 arranged to operate the vehicle 10 at, for example, highways at high speeds above 60 miles per hour. The low-gear ratio output corresponds to torque and speed outputs from the transmission 18 via the transfer case to at least two of tires $T_1$, $T_2$, $T_3$ and $T_4$, that are arranged to operate the vehicle 10 in off-road conditions where the speed of the vehicle is limited to speeds less than those arranged for highway driving (for example, speeds significantly less than 60 miles per hour).

The tire pressure monitor system 36 (herein after the TMPS 36) includes a plurality of air pressure sensors $S_1$, $S_2$, $S_3$ and $S_4$, that are installed to respective ones of the tires $T_1$, $T_2$, $T_3$ and $T_4$ of the vehicle 10. The TMPS 36 monitors the air pressure of each of the tires $T_1$, $T_2$, $T_3$ and $T_4$, via the plurality of air pressure sensors $S_1$, $S_2$, $S_3$ and $S_4$, and transmits the air pressure information of each of the tires $T_1$, $T_2$, $T_3$ and $T_4$ to the electronic controller 30.

The speed sensor 38 is configured to measure speeds of the vehicle 10 and provide current speed measurements to the electronic controller 30. The speed sensor 38 can be connected to the transmission 18, the instrument cluster 22 (for example, to the speedometer), or be located adjacent a drive shaft (not shown) that measures rotational speed of the drive shaft in order to measure the speed of the vehicle 10 and transmit the speed information to the electronic controller 30.

Figure 3:
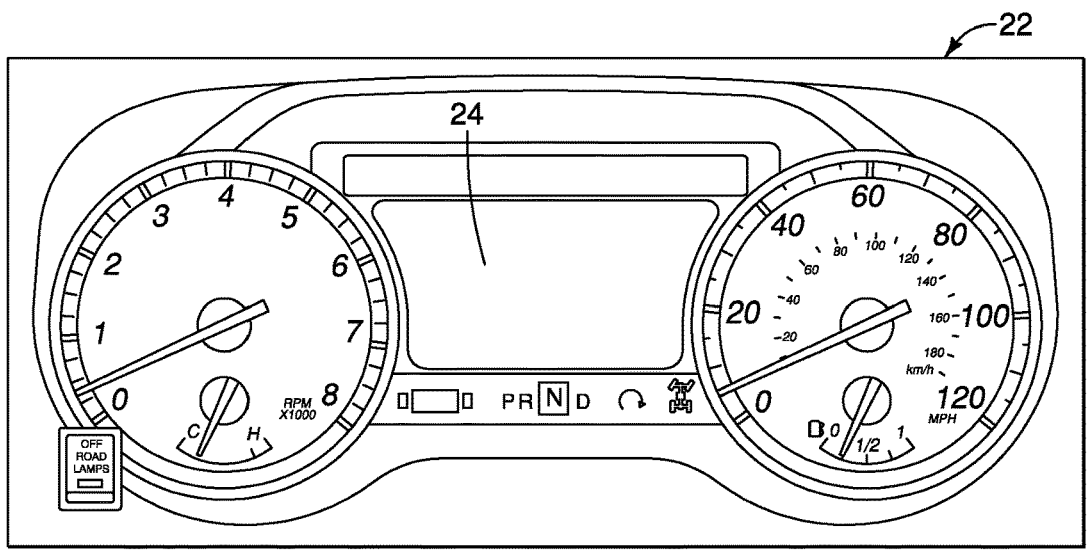
FIG. 3 is a schematic view of an instrument cluster installed to an instrument panel of the vehicle depicted in FIG. 1, showing an electronic display controlled by the electronic controller, the electronic display being operated to display menus that present settings that are manually selected by a vehicle operator of the vehicle depicted in FIG. 1 in accordance with the exemplary embodiment.

The display 40 (also referred to as an electronic display 40 or the Driver Info Center) is preferably part of the instrument cluster 22, shown in FIG. 3. The instrument cluster 22 is typically installed to the instrument panel (sometimes referred to as a dashboard). The instrument panel (not shown) extends from one lateral side of the passenger compartment 20 to the opposite side of the passenger compartment 20 (A-pillar to A-pillar). Alternatively, the display 40 can be located in a central area of the instrument panel (not shown) aligned with a center console (not shown) within the passenger compartment 20 of the vehicle 10. Since instrument panels and center consoles are conventional vehicles features, further description is omitted for the sake of brevity. The display 40 is configured to display any of a variety of screens that include selections that can be manually selected via operation of the input device 42. Operation of, for example, a toggle switch of the input device 42, makes it possible for the vehicle operator to toggle through various menus with selections for manual selection by the vehicle operator. The display 40 can also display input areas such that the vehicle operator can input various information, as described in greater detail below.

The input device 42 is electronically connected to the electronic controller 30 and is configured to receive manual selection modes of operation and related parameters selected by the vehicle operator while viewing selections displayed on the display 40. The input device 42 then transmits those manually inputted selections to the electronic controller 30.

The input device 42 can be a touch screen surface of the display 40 of the instrument cluster 22, or, can be a set of toggle switches and buttons (not shown) installed to the steering wheel (not shown) of the vehicle 10. Further, the input device 42 can alternatively be installed to the center console (not shown) or a central portion of the instrument panel (not shown). Since input devices are conventional vehicle components, further description is omitted for the sake of brevity. The input device 42 can alternatively be part of or can include the electronic display 40.

As described in greater detail below, the display 40 is configured to display a plurality of menus that include a list of modes of operation, including a screen with indicia representing: the normal mode and the first off-road mode; off-road speed limits; and, tire pressure indications, as well as additional data related to other functions and operations of the vehicle 10.

The electronic controller 30 is configured to operate the display 40 in order to display various menus that the vehicle operator selects using the input device 42. In the depicted embodiment, the electronic controller 30

More specifically, in response to operation of the input device 42, the electronic controller 30 can operate the electronic display 40 to display a plurality of modes of operation of a vehicle including a normal mode (highway driving mode), a first off-road mode, a second off-road mode, a third off-road mode and a fourth off-road mode of operation. In the normal mode, the tire air pressure of the tires $T_1$, $T_2$, $T_3$ and $T_4$ should be raised to the predetermined inflation pressure of the tires (a high-speed tire pressure) when the vehicle is to be driven at normal highway speeds in both urban and non-urban locations.

In the depicted embodiment, the first off-road mode has a corresponding a first off-road tire pressure that is less than the high-speed tire pressure; the second off-road mode has a corresponding a second off-road tire pressure that is less than the first off-road tire pressure; the third off-road mode has a corresponding a third off-road tire pressure that is less than the second off-road tire pressure; and the fourth off-road mode has a corresponding a fourth off-road tire pressure that is less than the third off-road tire pressure.

Further, the first off-road mode is defined with a corresponding maximum vehicle speed referred to hereinbelow as a first off-road speed limit. When the first off-road mode is selected by the vehicle operator, the electronic controller 30 operates the speed control device 32 such that the vehicle 10 is prevented from accelerating to speeds above the first off-road speed limit. The first off-road speed limit is a reduced speed that is below highway speeds of the normal operation mode.

The second off-road mode is defined with a corresponding maximum vehicle speed referred to hereinbelow as a second off-road speed limit. When the second off-road mode is selected by the vehicle operator, the electronic controller 30 operates the speed control device 32 such that the vehicle 10 is prevented from accelerating to speeds above the second off-road speed limit. The second off-road speed limit is a reduced speed that is below or less than the first off-road speed limit.

The third off-road mode is defined with a corresponding maximum vehicle speed referred to hereinbelow as a third off-road speed limit. When the third off-road mode is selected by the vehicle operator, the electronic controller 30 operates the speed control device 32 such that the vehicle 10 is prevented from accelerating to speeds above the third off-road speed limit. The third off-road speed limit is a reduced speed that is below or less than the second off-road speed limit.

The fourth off-road mode is defined with a corresponding maximum vehicle speed referred to hereinbelow as a fourth off-road speed limit. When the fourth off-road mode is selected by the vehicle operator, the electronic controller 30 operates the speed control device 32 such that the vehicle 10 is prevented from accelerating to speeds above the fourth off-road speed limit. The fourth off-road speed limit is a reduced speed that is below or less than the third off-road speed limit.

It should be understood from the drawing and the description that the electronic controller 30 can be configured to operate in a variety of numbers of off-road modes. For example, in some vehicle, only one off-road mode of operation can be provided; in other vehicles, only two or three off-road modes of operation can be available depending upon the vehicle design and off-road capabilities built into the vehicle. In other words, the vehicle 10 is not required to have all four off-road modes of operation described herein.

The electronic controller 30 also operates the display 40 to display status of the vehicle transmission 18 and transfer case. Specifically, the electronic controller 30 receives transmissions from the transmission sensor(s) 34 that identify the current setting of the transmission 18. Specifically, the transmission 18 (specifically, its transfer case) can include a high gear ratio output mode and a low gear ratio output mode. When the transmission 18 is set for outputting torque to the tires in the high gear ratio output mode, the speeds of the torque outputted are designed for normal driving operation of the vehicle 10 at highway speeds. When the transmission 18 is set for outputting torque to the tires in the low gear ratio output mode, the speeds of the torque outputted are designed for off-road driving operation of the vehicle 10 at speeds that are significantly less than highway speeds. Since operation of transfer cases of vehicle to switch between high and low gear ratio output modes are conventional vehicle features, further description is omitted for the sake of brevity. Hence, the transmission sensor(s) 34 transmit signals to the electronic controller 30 indicating the current mode of operation of the transmission 18.

The transmission sensor 34 can include a single sensor that detects transmission mode, or, multiple sensors where one sensor detects when the transmission 18 is set to the high gear ratio output mode and another sensor that detects when the transmission 18 is set to the low gear ratio output mode (also referred to as 4Lo, or four-wheel drive low).

The electronic controller 30 is therefore configured to display at least three different menus on the display 40 and receive manually inputted selections from the vehicle operator via the input device 42. Specifically, the display is operated to select the mode of operation of the transmission, high gear ration output or low gear ratio output. The display 40 is further operated to display a menu with the modes of operation including, normal mode, the first off-road mode, the second off-road mode, the third off-road mode and the fourth off-road mode. Correspondingly, the display 40 is configured to select the tire air pressure corresponding to the selected off-road mode, and an off-road speed limit (a maximum speed for each corresponding off-road mode). The off-road tire pressures can be set by the vehicle operator, or, can be pre-set and pre-defined tire pressures defined at the factory when the vehicle 10 is manufactured and programmed. Similarly, the off-road speed limits can be set by the vehicle operator, or, can be pre-set and pre-defined reduced speeds defined at the factory when the vehicle 10 is manufactured and programmed.

However, in the depicted embodiment, in response to selection of the normal mode, the electronic controller requires the tire air pressure to be set to a high-speed tire pressure. In response to selection of the first off-road mode, the electronic controller 30 requires tire air pressure to be set to the first off-road tire pressure and the first off-road speed limit is also predetermined or pre-set. In response to selection of the second off-road mode, the electronic controller 30 requires tire air pressure to be set to the second off-road tire pressure and the second off-road speed limit is also predetermined or pre-set. In response to selection of the third off-road mode, the electronic controller 30 requires tire air pressure to be set to the third off-road tire pressure and the third off-road speed limit is also predetermined or pre-set. Similarly, in response to selection of the fourth off-road mode, the electronic controller 30 requires tire air pressure to be set to the fourth off-road tire pressure and the fourth off-road speed limit is also predetermined or pre-set.

Once one of the off-road modes has been selected, the electronic controller 30 requires the vehicle operator to switch the transmission 18 to the low gear ratio output mode (4Lo) and to lower the air pressure in the tires $T_1$, $T_2$, $T_3$ and $T_4$ to the corresponding off-road tire pressure (for example, if the second off-road mode has been selected by the vehicle operator, the vehicle operator is required to lower the air pressure in the tires $T_1$, $T_2$, $T_3$ and $T_4$ to the second off-road speed limit). Once the transmission 18 to operation in the low gear ratio output mode, and the tire air pressure has been appropriately lowered, then the vehicle 10 can be operated off-road. Once the vehicle 10 is in motion and operating off-road, the electronic controller 30 operates the speed control device 32 limiting the vehicle speed to speeds under the selected off-road speed limit. In other words, the electronic controller 30 uses speed measurements from the speed sensor 38 as part of a feedback loop to operate the speed control device 32, allowing acceleration of the vehicle 10 as per the vehicle operator's actions, but prevents the speed of the vehicle 10 from reaching speeds greater than the selected off-road speed limit. Hence, the off-road speed control assembly 12 operates as an automatic speed limiter (ASL).

Since the electronic controller 30 is in electronic communication with the speed control device 32, the speed sensor 38 and the plurality of tire pressure sensors $S_1$, $S_2$, $S_3$ and $S_4$, the electronic controller 30 operates the speed control device 32 accordingly, limiting speed of the vehicle 10.

When the vehicle operator switches back to the normal driving mode, the electronic controller 30 notifies the vehicle operator via the electronic display 40 that the tire air pressure must be raised back to the high-speed tire pressure. Once the tire air pressure of all four tires has been appropriately increased, then, the electronic controller 30 notifies the vehicle operator via the electronic display 40 that the transmission 18 can be switched to the high gear ratio output mode. Only then does the electronic controller 30 remove the restriction on vehicle speed. In other words, if the tire pressure has not been raised accordingly and the transmission 18 has not been switched to high gear ratio output mode, the electronic controller 18 remains in the previously selected off-road mode with the off-road speed limit in place until after the tire pressure has been increased and the transmission 18 switched accordingly.

Since the electronic controller 30 is connected to the transmission sensor(s) 34 (also referred to as mode sensor), the speed sensor 38 and the speed control device 32, the electronic controller 30 can prevent a change to the normal driving mode until the tire air pressure has been increase to the correct tire air pressure and the transmission 18 switched to the high gear ratio output mode (4Hi). Alternatively, the electronic controller 30 can be configured such that when controlling the speed control device 32 in any one of the first, second, third or fourth off-road modes, the electronic controller 30 prevents manual switching from the any one of the first, second, third or fourth off-road mode to the normal mode in response to determining that the plurality of tires $T_1$, $T_2$, $T_3$ and $T_4$ are inflated to an air pressure lower than the high-speed tire pressure.

The electronic controller 30 is further configured such that the transmission 18 is prevented from switching from the low gear ratio mode to the high gear ratio mode until after the tire air pressure has increased to the high-speed tire pressure.

Once in the normal mode, the electronic controller 30 operates the speed control device 32 without speed restrictions.

Figure 4:
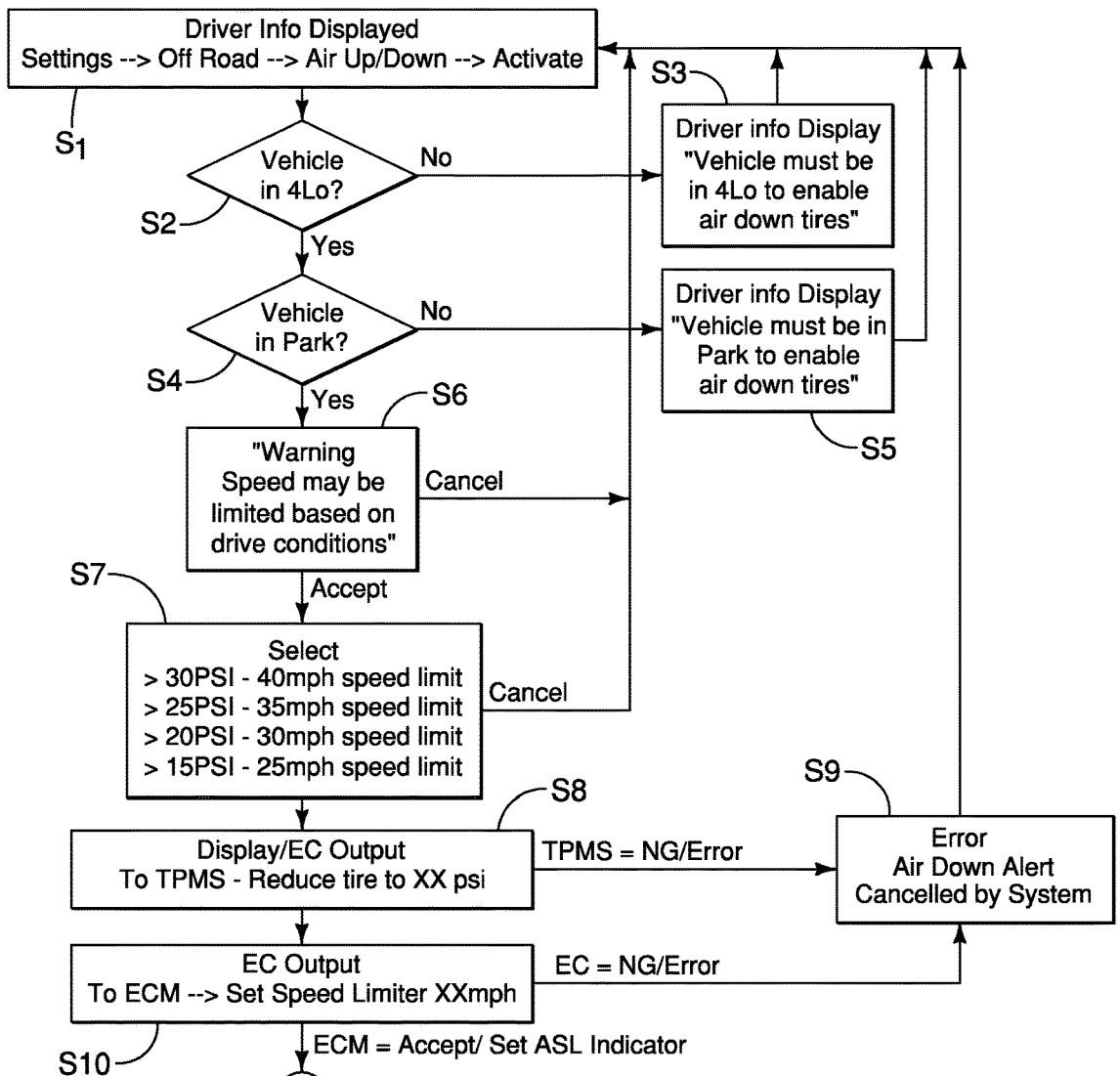
FIG. 4 is a first flowchart showing one example logic used by the electronic controller of the off-road speed control assembly in accordance with the exemplary embodiment.
Figure 5:
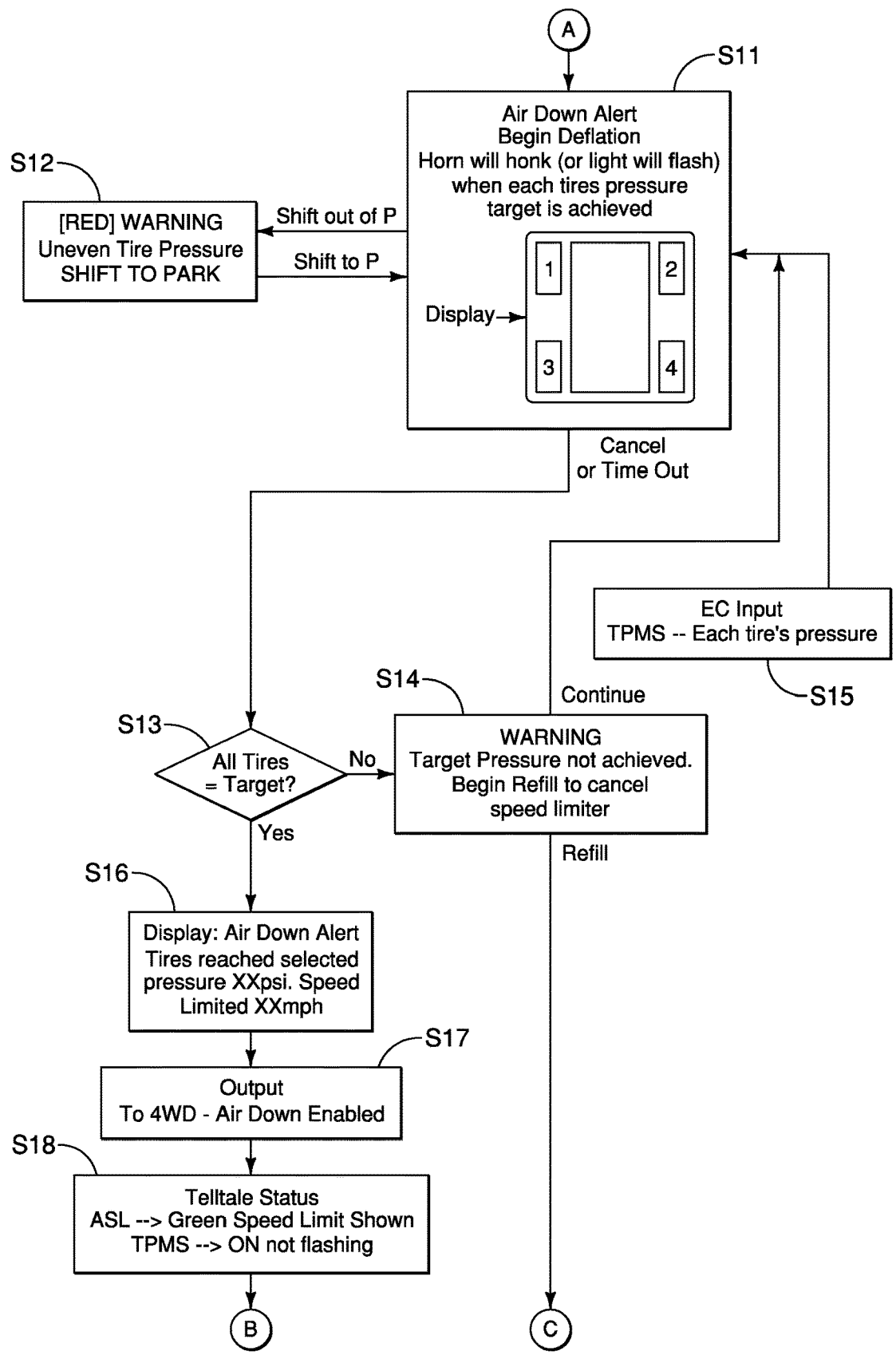
FIG. 5 is a second flowchart that continues the logic of the first flowchart of FIG. 4 and used by the electronic controller of the off-road speed control assembly in accordance with the exemplary embodiment.
Figure 6:
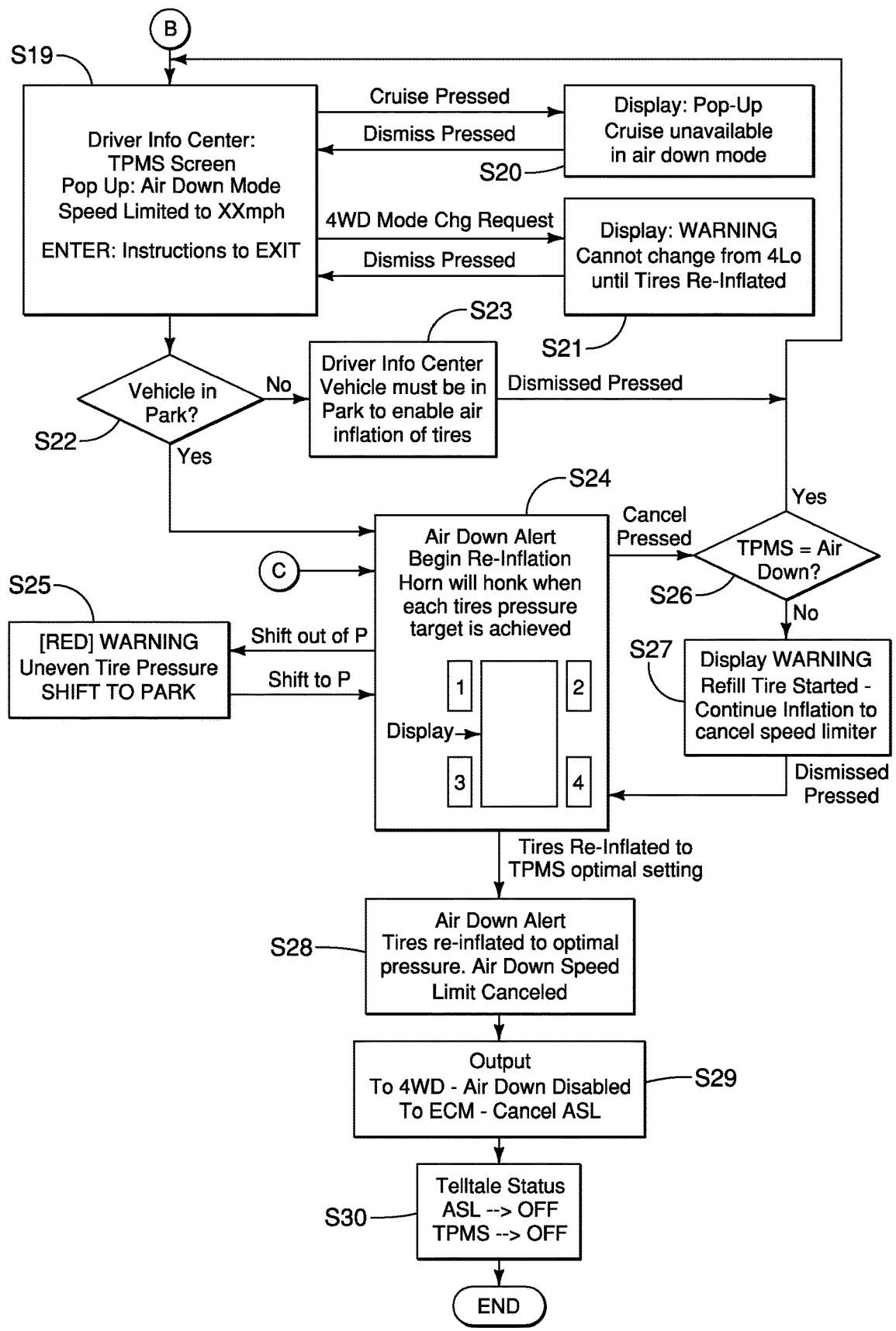
FIG. 6 is a third flowchart that continues the logic of the first and second flowcharts of FIGS. 4 and 5 and used by the electronic controller of the off-road speed control assembly in accordance with the exemplary embodiment.

A description is now provided for one example of logic used by the electronic controller 30, with specific reference to the flowcharts in FIGS. 4, 5 and 6.

At step S1 in FIG. 4, the vehicle 10 is being operated by the vehicle operator, but is not in motion. The vehicle operator operates the input device 42 and toggles through the menus and selects one of the off-road modes of operation thereby alerting the electronic controller 30 that the off-road mode is to be activated. Operation then moves to step S2 where the electronic controller 30 determines whether or not the vehicle operator has switched the transmission 18 to the low gear ratio output mode (4Lo mode). If not, operation moves to step S3 where the electronic controller 30 operates the display 40 to display Driver Info that includes a statement that the "vehicle must be in 4Lo in order to enable air down tires". In other words, the vehicle operator is being informed that the transmission 18 must be switched to low gear ratio output mode (4Lo mode) before proceeding any further.

At step S2, if yes, then operation moves to step S4 where the electronic controller 30 determines whether or not the transmission 18 is in Park and therefore not in motion. If no, then operation moves to step S5 where the electronic controller 30 operates the display 40 to display Driver Info that includes a statement that the "vehicle must be in Park in order to enable air down tires". At step S4, if yes, then operation moves to step S6 where the electronic controller 30 operates the display 40 to show "Warning Speed may be limited based on driving conditions". At this point it is possible for the vehicle operator to use the input device 42 to cancel the selection of off-road operation, and, return to step S1. If the vehicle operator accepts the warning via input to the input device 42, the electronic controller 30 moves to step S7.

At step S7, the electronic controller 30 operates the display 40 to show a selection menu that includes a list of off-road air pressures and off-road speed limits, one for each of the four off-road modes. Specifically, for the first off-road mode, the vehicle operator selects the tire air pressure and speed limit ">30 PSI-40 mph speed limit". For the second off-road mode, the vehicle operator selects the tire air pressure and speed limit ">25 PSI-35 mph speed limit". For the third off-road mode, the vehicle operator selects the tire air pressure and speed limit ">20 PSI-30 mph speed limit". For the fourth off-road mode, the vehicle operator selects the tire air pressure and speed limit ">15 PSI-25 mph speed limit".

Once the vehicle operator selects one of the four off-road modes of operation, the electronic controller 30 internally sets an Air Down Alert code moves to step S8. At step S8, the electronic controller 30 operates the display 40 to show "ECM->Reduce tire to XX psi". In other words, the electronic controller 30 (ECM) is informing the vehicle operator that the tire air pressure is to be lowered to the tire air pressure corresponding to the selected off-road mode selected. If the tire pressure management system 36 (TPMS) determines that there is a problem with one or more of the air pressure sensors $S_1$, $S_2$, $S_3$ and $S_4$, or other related problem, then the electronic controller 30 issues a NG/error signal or code (NG=no good) and operation moves to step S9 where the Air Down Alert code is canceled and operation returns to step S1. If no problem is detected at step S8, then operation moves to step S10.

At step S10, the electronic controller 30 sets internal operation of the speed control device 32 to include a speed limiter such that once the vehicle operator begins operating the vehicle 10 in the selected off-road mode, the speed of the vehicle 10 will be limited to the corresponding maximum speed limit corresponding to the selected off-road mode (selected at step S7). If the electronic controller 30 (EC) determines that there is a problem with one or more of the components of the off-road speed control assembly 12, then the electronic controller 30 issues a NG/error signal or code (NG=no good) and operation moves to step S9 where the Air Down Alert code is canceled and operation returns to step S1. If no problem is detected at step S10, then operation moves to step S11 shown in FIG. 5.

At step S11, the electronic controller 30 displays an image of the vehicle 10 and the four tires $T_1$, $T_2$, $T_3$ and $T_4$ (1, 2, 3 and 4) and further displays "Air Down Alert, Begin Deflation (of tires)". The display 40 further can show text indicating that the vehicle horn (not shown) and/or the headlamp will operate once each tire, one at time, has achieved the tire air pressure corresponding to the selected off-road mode. If the vehicle operator fails to complete the air down process (lowering air pressure in all tires) and shifts the transmission 18 out of Park in order to operate the vehicle 10, operation moves to step S12 where the display 40 displays a red warning to the vehicle operator and further stating that the tire air pressures of the four tires are uneven or air down has not been completed, requesting that the transmission 18 be shifted back to Park immediately.

At step S15, the electronic controller 30 is continuously provided with signals from the TPMS 36 (and air pressure sensors $S_1$, $S_2$, $S_3$ and $S_4$) of the current tire air pressure in each of the tires $T_1$, $T_2$, $T_3$ and $T_4$. At step S11, the tire air pressures are continuously monitored when the Air Down Alert process is ongoing. Further, at step S11, the electronic controller 30 pauses for a predetermined period of time such that the vehicle operator can lower the tire air pressure in each of the tires $T_1$, $T_2$, $T_3$ and $T_4$. The predetermined period of time can be anywhere from 2 minutes to 10 minutes and can be set by the vehicle operator using the input device 42.

After the predetermined period of time has elapsed at step S11, operation moves to step S13 where the electronic controller 30 determines whether or not all four tires have had their tire air pressure lowered to the tire air pressure of the selected off-road mode of operation. If not, operation moves to step S14 where the display 40 shows a warning "Target Pressure not achieved. Begin Refill (of tires) to cancel speed limiter". At step S14, once the tire are pressure for all four tires has returned to the high-speed tire pressure, operation moves to step S24 in FIG. 6.

At step S13, if all tires have been lowered to the target tire air pressure (the tire air pressure corresponding to the selected off-road mode of operation), then operation moves to step S16. At step S16, the display 40 is operated to display "Air Down Alert. Tires reached selected tire pressure of XX psi. Speed is now limited to XX mph" where XX psi and XX mph correspond to the tire air pressure and off-road speed limit of the selected off-road mode of operation.

Next, at step S17, the electronic controller 30 communicates with the transmission 18 to enable four-wheel drive (if vehicle 10 is equipped with four-wheel drive), confirming that Air Down is enabled. In other words, the vehicle 10 can now be operated in the selected off-road mode of operation.

Next, at step S18, a telltale status indicator (not shown) is displayed on the display 40 showing the letters ASL (automatic speed limiter), a green speed limit corresponding to off-road speed limit of the selected off-road mode and the TPMS indicator (not shown) on the display 40 is illuminated, but without flashing (or blinking). A blinking or flashing TPMS indicator typically indicates a problem with the TPMS. Thereafter, operation moves to step S19 in FIG. 6.

At step S19 in FIG. 6, a number of parameters are monitored, and, the display shows that the TPMS is okay (not blinking or flashing), the Air Down Mode is currently enabled (with the tire pressure reduced to at or below the selected off-road tire pressure) and the Speed is Limited to XX mph (the selected off-road speed limit). Hence, at step S19, the off-road speed control assembly 12 operates as an automatic speed limiter (ASL).

While operating as part of the automatic speed limiter (ASL), the electronic controller 30 operates the display 40 showing an option to exit that can be selected at any time by the vehicle operator using the input device 42.

At step S19, if the vehicle operator attempts to operate a cruise control system (not shown) of the vehicle 10, operation moves to step S20, where the display 42 is operated to display "Cruise unavailable in Air Down Mode". The selection of operation of the cruise control is dismissed and control returns to step S19.

Further, at step S19, if the vehicle operator attempts to change the settings of the transmission 18 out of four-wheel drive mode or out of 4Lo, operation moves to step $S_{21}$, where the display 42 is operated to display "Warning, Cannot change from 4Lo until Tire Re-Inflated". The selection of switching the transmission 18 from 4Lo is dismissed and control returns to step S19.

At step S19, if the vehicle operator decides to exit the selected off-road mode and return to normal mode, operation moves to step S22. At step S22, the electronic controller 30 determines whether or not the transmission 18 has been shifted into Park. If not, operation moves to step S23 where the display 40 (the Driver Info Center) is operated to display "Vehicle Must Be in Park to enable inflation of tires". The request to exit is dismissed and operation returns to step S19.

At step S22 if the transmission 18 is in Park, then operation moves to step S24. At step S24, the Air Down Alert is paused and the vehicle operator instructed to "Begin Re-inflation (of the tires). The display 40 again displays an image of the vehicle and the four tires (1, 2, 3 and 4). If the vehicle operator attempts to shift the transmission 18 out of Park, operation moves to step S25 where the display 40 displays a red warning to the vehicle operator and further stating that the tire air pressures of the four tires are uneven or re-inflation process has not been completed, requesting that the transmission 18 be shifted back to Park immediately.

Further, at step S24, if the vehicle operator uses the input device 42 to cancel the re-inflation process, operation moves to step S26. At step S26, the electronic controller 30 determines the status of the tire air pressure of each of the four tires via the TPMS 36. If the TPMS 36 indicates that all four tires remain at the tire air pressure (off-road tire pressure) for the selected off-road mode of operation, the operation returns to step S10. At step S26, if one or more of the tires has a tire pressure greater than the tire air pressure (off-road tire pressure) for the selected off-road mode of operation, then operation moves to step S27. At step S27, the display 40 is operated to show "WARNING Refill Tire Started. Continue inflation to cancel speed limiter". The request to cancel re-inflation is then dismissed and operation returns to step S24.

At step S24, after a predetermined time period has ended that allowed the vehicle operator to re-inflate all four tires, the electronic controller 30, while monitoring the TPMS 36, determines whether or not the tires have been re-inflated to high-speed tire pressure. If not, operation stays at step S27. If yes, then moves to step S28.

At step S28, the electronic controller 30 ends the Air Down Alert and ends the ASL (automatic speed limiter). Next, at step S29, the electronic controller 30 disables the restrictions that were enabled when the Air Down Alert was enabled. Specifically, transmission 18 can now be shifted to the high gear ratio output mode and the ASL is disabled allowing the vehicle 10 to be operated at highway speeds.

Next, at step S30, the display is operated to turn off the ASL display and the TPMS display. Thereafter, the vehicle 10 can be driven in the normal mode at highway speeds.

The various parts of the vehicle 10, other than the off-road speed control assembly 12, are conventional components that are well known in the art. Since these conventional components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the off-road vehicle speed control assembly. Accordingly, these terms, as utilized to describe the present invention should be interpreted relative to a vehicle equipped with the off-road vehicle speed control assembly.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. An off-road vehicle speed control assembly, comprising
   a speed control device configured to control speed of a vehicle power plant of a vehicle;
   a speed sensor configured to measure speeds of the vehicle;
   a plurality of tire pressure sensors installed to corresponding ones of a plurality of tires of the vehicle;
   an electronic controller in electronic communication with the speed control device, the speed sensor and the plurality of tire pressure sensors, the electronic controller being configured to operate the speed control device in at least two different modes of operation: a normal mode in which the plurality of tires are inflated to a high-speed tire pressure; and a first off-road mode in which the plurality of tires are inflated to a first off-road tire pressure that is less than the high-speed tire pressure, and
   in the normal mode speeds of the vehicle are unrestricted by the electronic controller, and in the first off-road mode speeds of the vehicle are restricted by the electronic controller to speeds at or below a first off-road speed limit.

2. The off-road vehicle speed control assembly according to claim 1, further comprising
   a transmission operable in at least two gear ratio modes a high gear ratio mode and a low gear ratio mode;
   a mode sensor connected to the transmission and configured to detect which gear ratio mode has been selected for operation of the transmission, and
   the electronic controller is further connected to the mode sensor and the transmission, and is configured to operate of the speed control device in the first off-road mode with the transmission switched to the low gear ratio mode.

3. The off-road vehicle speed control assembly according to claim 1, wherein
   the speed control device includes a throttle mechanism of the power plant that is configured to selectively increase and selectively decrease acceleration of the power plant.

4. The off-road vehicle speed control assembly according to claim 1, wherein
   the electronic controller is further configured to operate the speed control device in a second off-road mode in response to a determination that the plurality of tires are inflated to a second off-road tire pressure that is less than the first off-road tire pressure, and in the second off-road mode speeds of the vehicle are restricted by the electronic controller to speeds at or below a second off-road speed limit that is less than the first off-road speed limit.

5. The off-road vehicle speed control assembly according to claim 4, wherein
   the electronic controller is further configured to operate the speed control device in a third off-road mode in response to a determination that the plurality of tires are inflated to a third off-road tire pressure that is less than the second off-road tire pressure, and in the third off-road mode speeds of the vehicle are restricted by the electronic controller to speeds at or below a third off-road speed limit that is less than the second off-road speed limit.

6. The off-road vehicle speed control assembly according to claim 5, wherein
   the electronic controller is further configured to operate the speed control device in a fourth off-road mode in response to a determination that the plurality of tires are inflated to a fourth off-road tire pressure that is less than the third off-road tire pressure, and in the fourth off-road mode speeds of the vehicle are restricted by the electronic controller to speeds at or below a fourth off-road speed limit that is less than the third off-road speed limit.

7. The off-road vehicle speed control assembly according to claim 1, wherein
the electronic controller is further configured such that when controlling the speed control device in the first off-road mode, the electronic controller prevents manual switching from the first off-road mode to the normal mode in response to determining that the plurality of tires are inflated to an air pressure lower than the high-speed tire pressure.

8. The off-road vehicle speed control assembly according to claim 1, further comprising
an input device connected to the electronic controller configured to receive manual selection modes of operation and related parameters.

9. The off-road vehicle speed control assembly according to claim 8, wherein
the input device is connected to an electronic display configured to display a plurality of menus that include a list of modes of operation, including a screen with indicia representing: the normal mode and the first off-road mode; off-road speed limits; and tire pressure indications.

10. An off-road vehicle speed control assembly, comprising
an electronic display configured to display: at least three modes of operation of a vehicle including a normal mode, a first off-road mode and a second off-road mode, modes of operation of a vehicle transmission including in a high gear ratio output mode and a low gear ratio output mode, and a corresponding maximum vehicle speed for each of the first off-road mode and the second off-road mode;
an input device configured to receive manually inputted vehicle operator selection of: one of the at least three modes of operation and corresponding maximum vehicle speed for the first off-road mode and the second off-road mode; and selection of one of the modes of operation of the vehicle transmission;
a speed control device configured to control speed of a vehicle power plant of a vehicle;
a speed sensor configured to measure speeds of the vehicle;
a plurality of tire pressure sensors installed to corresponding ones of a plurality of tires of the vehicle;
an electronic controller in electronic communication with the electronic display, the input device, the speed control device, the speed sensor and the plurality of tire pressure sensors, the electronic controller being configured to operate the speed control device in response to the selection of one of the three modes of operation of the vehicle such that in response to selection of the normal mode the electronic controller operates the speed control device without speed restrictions, in response to selection of the first off-road mode the electronic controller limits operation of the speed control device to at or under a first off-road speed limit, and in response to selection of the second off-road mode the electronic controller limits operation of the speed control device to at or under a second off-road speed limit lower than the first off-road speed limit.

11. The off-road vehicle speed control assembly according to claim 10, wherein
the electronic display is further configured to display a first off-road tire pressure corresponding to the first off-road mode and a second off-road tire pressure corresponding to the second off-road mode, and
the electronic display is further configured such that:
in response to selection of the normal mode, the electronic controller requires the tire air pressure to be set to a high-speed tire pressure;
in response to selection of the first off-road mode, the electronic controller requires tire air pressure to be set to a first off-road tire pressure that is less than the high-speed tire pressure; and
in response to selection of the second off-road mode, the electronic controller requires tire air pressure to be set to a second off-road tire pressure that is lower than both the high-speed tire pressure and the first off-road tire pressure.

12. The off-road vehicle speed control assembly according to claim 11, wherein
the electronic controller is further configured such that the transmission must be switched from high gear ratio mode to the low gear ratio mode in order to operate the speed control device in either one of the first off-road mode or the second off-road mode.

13. The off-road vehicle speed control assembly according to claim 12, wherein
the electronic controller is further configured such that the transmission is prevented from switching from the low gear ratio mode to the high gear ratio mode until the tire pressure has increased to the high-speed tire pressure.

* * * * *